US012709411B2

(12) United States Patent
Baladhandapani et al.

(10) Patent No.: US 12,709,411 B2
(45) Date of Patent: Aug. 18, 2026

(54) METHOD AND SYSTEM OF FAULT DETECTION FOR AN AIRCRAFT

(71) Applicant: HONEYWELL INTERNATIONAL INC., Charlotte, NC (US)

(72) Inventors: Gobinathan Baladhandapani, Madurai (IN); Anand Kutuva Arjunan, Madurai (IN); Karthikeyan M, Madurai (IN)

(73) Assignee: Honeywell Aerospace US LLC, Phoenix, AZ (US)

( * ) Notice: Subject to any disclaimer, the term of this patent is extended or adjusted under 35 U.S.C. 154(b) by 80 days.

(21) Appl. No.: 18/892,860

(22) Filed: Sep. 23, 2024

(65) Prior Publication Data

US 2026/0084838 A1 Mar. 26, 2026

(51) Int. Cl.

| | |
|---|---|
| ***B64F 5/40*** | (2017.01) |
| ***B64F 5/60*** | (2017.01) |
| ***G07C 5/00*** | (2006.01) |
| ***G07C 5/08*** | (2006.01) |

(52) U.S. Cl.

CPC ................ *B64F 5/60* (2017.01); *G07C 5/008* (2013.01); *G07C 5/0808* (2013.01); *G07C 5/0816* (2013.01)

(58) Field of Classification Search

CPC ......... B64F 5/60; G07C 5/008; G07C 5/0808; G07C 5/0816

See application file for complete search history.

(56) References Cited

U.S. PATENT DOCUMENTS

| | | | | |
|---|---|---|---|---|
| 5,919,267 | A | 7/1999 | Urnes et al. | |
| 6,256,594 | B1 * | 7/2001 | Yamamoto | G07C 5/0808 702/184 |
| 9,547,944 | B2 | 1/2017 | Nelson et al. | |
| 11,887,408 | B2 * | 1/2024 | Mattern | G05B 23/0259 |
| 2007/0028220 | A1 | 2/2007 | Miller et al. | |
| 2010/0312420 | A1 * | 12/2010 | Sham | G06Q 10/00 701/3 |
| 2011/0144854 | A1 * | 6/2011 | Cramer | G07C 5/0808 726/16 |
| 2013/0124034 | A1 * | 5/2013 | Lentz | B64F 5/60 701/31.4 |
| 2013/0274991 | A1 | 10/2013 | Cheriere et al. | |

(Continued)

FOREIGN PATENT DOCUMENTS

| | | | |
|---|---|---|---|
| CN | 102722722 | A | 2/2014 |
| CN | 104392072 | A | 3/2015 |

(Continued)

*Primary Examiner* — Calvin Cheung

(74) *Attorney, Agent, or Firm* — Ingrassia Fisher & Lorenz

(57) ABSTRACT

A method comprises receiving, by at least one processor remote from an aircraft, fault data automatically transmitted from the aircraft without initiation by a user on the aircraft and indicating a type of fault indicating a component on the aircraft that caused the fault. The type of fault is determined by analyzing parameter data generated by one or more sensors monitoring at least one parameter of the component. The method also includes analyzing, by at least one processor remote from the aircraft, the fault data to confirm whether the fault data correctly indicates the type of fault exists, and transmitting instructions to the aircraft to perform or not perform an act related to the fault.

17 Claims, 7 Drawing Sheets

(56) References Cited

U.S. PATENT DOCUMENTS

| | | | | |
|---|---|---|---|---|
| 2014/0309820 | A1 | 10/2014 | O'Dell et al. | |
| 2016/0318622 | A1* | 11/2016 | Haukom | B64D 45/0051 |
| 2016/0364920 | A1* | 12/2016 | Nelson | B60K 35/85 |
| 2017/0331844 | A1* | 11/2017 | Harrigan | G06N 20/00 |
| 2019/0147670 | A1* | 5/2019 | Chopra | G07C 5/0808 701/29.1 |
| 2019/0279443 | A1* | 9/2019 | Bharadwaj | G06F 16/955 |
| 2020/0110181 | A1* | 4/2020 | Lu | G05B 23/0243 |
| 2020/0151967 | A1* | 5/2020 | Boggio | G07C 5/006 |
| 2022/0063839 | A1* | 3/2022 | Misenheimer | G05B 23/0278 |
| 2022/0135244 | A1* | 5/2022 | Lee | G07C 5/0808 340/945 |
| 2022/0137645 | A1* | 5/2022 | Vicq | H04L 67/12 701/3 |
| 2022/0374006 | A1* | 11/2022 | Bati | G05B 23/0283 |
| 2022/0406103 | A1* | 12/2022 | Sakata | G07C 5/0808 |
| 2024/0331453 | A1* | 10/2024 | Underwood | B64F 5/60 |
| 2024/0359826 | A1* | 10/2024 | Adhikari | G07C 5/0808 |

FOREIGN PATENT DOCUMENTS

| | | | | |
|---|---|---|---|---|
| CN | 103559135 | A | 3/2016 | |
| EP | 3992929 | A1 * | 5/2022 | B64D 45/00 |
| EP | 4215443 | A1 * | 7/2023 | G01D 21/02 |

* cited by examiner 102
100
104
124
126
106
Communication
122
Communication
128
120
Fault
Database
132
Controller
Processor(s)
116
Memory
F. Tree 142
Programs
118
130
Fault
Database
134
136
Memory
Program
138
F. Tree 144
Controller
Processor(s)
112
114
108
Display
Device
140
Onboard Data Sources
Sensors
110

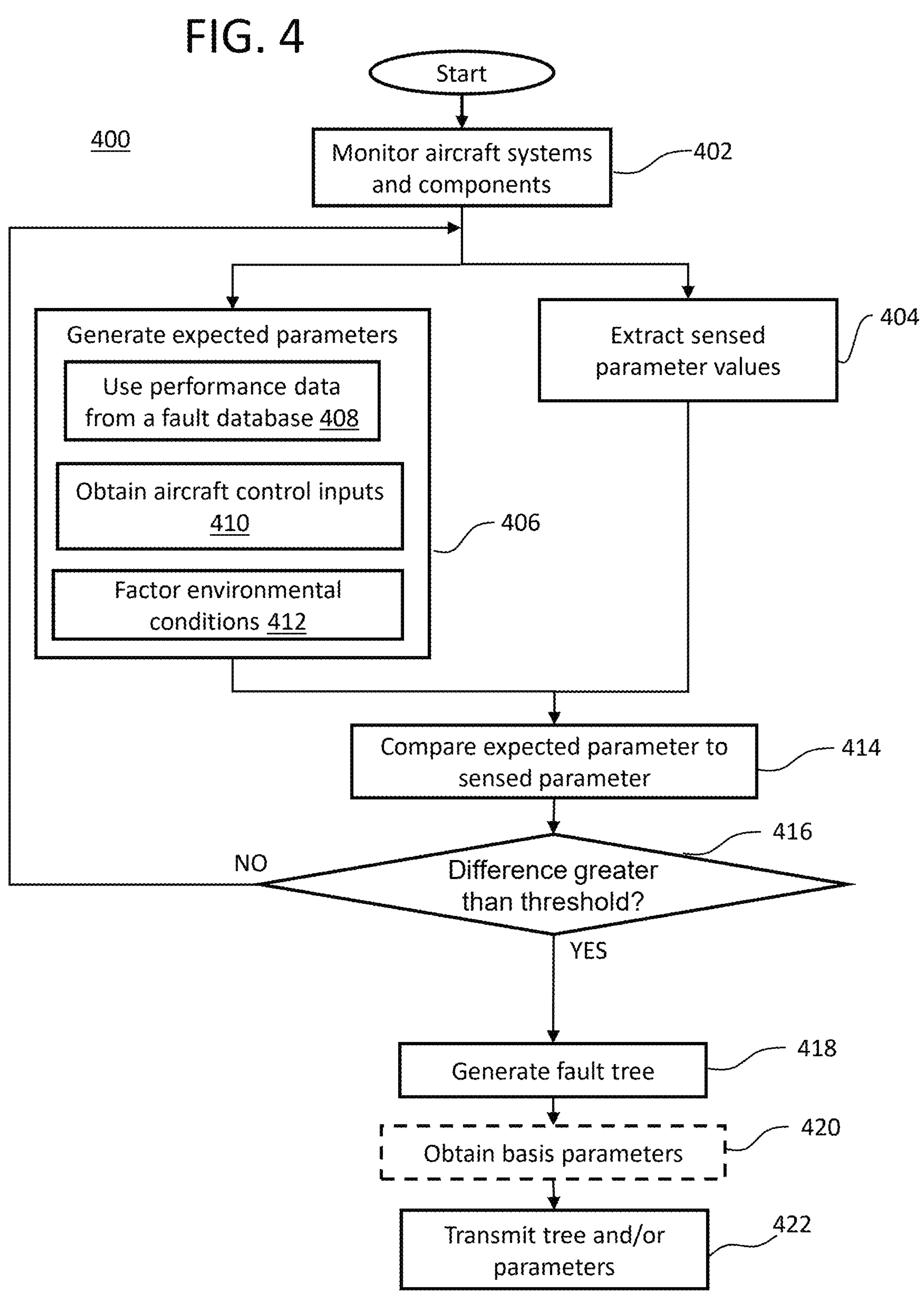
FIG. 4
400
Start
Monitor aircraft systems and components
402
Generate expected parameters
Use performance data from a fault database 408
Obtain aircraft control inputs 410
Factor environmental conditions 412
406
Extract sensed parameter values
404
Compare expected parameter to sensed parameter
414
Difference greater than threshold?
416
NO
YES
Generate fault tree
418
Obtain basis parameters
420
Transmit tree and/or parameters
422

FIG. 5

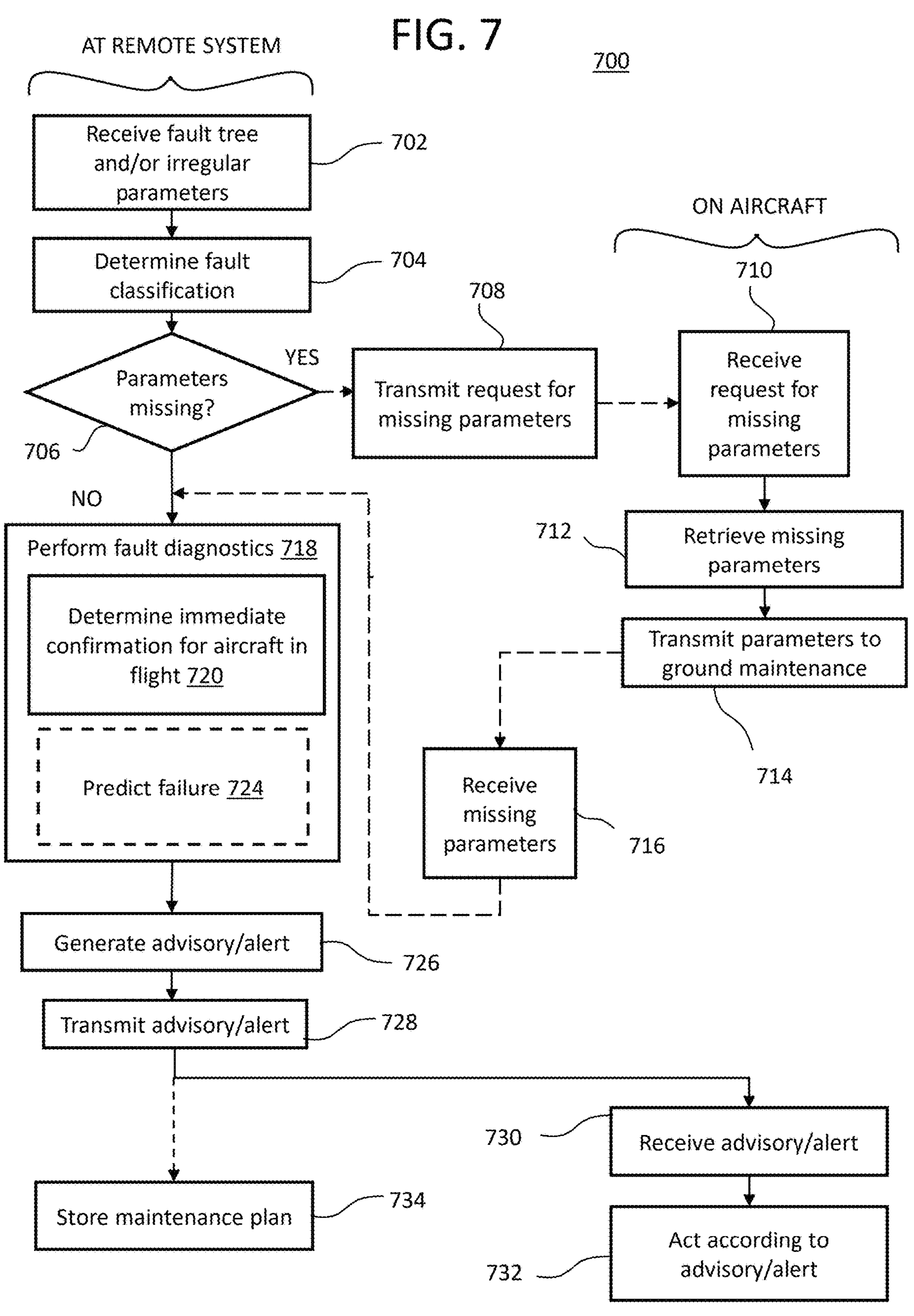
FIG. 7
700
AT REMOTE SYSTEM
Receive fault tree and/or irregular parameters
702
Determine fault classification
704
Parameters missing?
706
YES
NO
Transmit request for missing parameters
708
ON AIRCRAFT
710
Receive request for missing parameters
712
Retrieve missing parameters
Transmit parameters to ground maintenance
714
Receive missing parameters
716
Perform fault diagnostics 718
Determine immediate confirmation for aircraft in flight 720
Predict failure 724
Generate advisory/alert
726
Transmit advisory/alert
728
730
Receive advisory/alert
Store maintenance plan
734
732
Act according to advisory/alert

METHOD AND SYSTEM OF FAULT DETECTION FOR AN AIRCRAFT

TECHNICAL FIELD

The subject matter described herein generally relates to vehicles, and more particularly, to analysis of sensor data for fault detection on an aircraft.

BACKGROUND

Current fault detection systems on an aircraft use an array of sensors on the aircraft to detect current parameters of components of the aircraft, such as the flaps, engines, and so forth. Such systems analyze data from the sensors, and upon detecting a fault, transmit the fault data to a maintenance base remote from the aircraft so that the aircraft can be repaired when the aircraft returns to the ground. These systems, however, may be improved to provide additional capabilities.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one implementation, a method includes receiving, by at least one processor remote from an aircraft, fault data automatically transmitted from the aircraft without initiation by a user on the aircraft and indicating a type of fault indicating a component on the aircraft that caused the fault. The type of fault is determined by analyzing parameter data generated by one or more sensors monitoring at least one parameter of the component. The method also includes analyzing, by at least one processor remote from the aircraft, the fault data to confirm whether the fault data correctly indicates the type of fault exists, and transmitting instructions to the aircraft to perform or not perform an act related to the fault.

In another implementation, an aircraft comprises sensors monitoring components on the aircraft, and processor circuitry forming at least one processor arranged to operate by: generating sensor parameter data by using the sensors, and analyzing the sensor parameter data to determine if one of the components has a fault. The processor also is arranged to operate by generating fault data in the form of a fault tree indicating the type of fault, automatically transmitting the fault data without a user on the aircraft initiating the transmission, and receiving a fault confirmation transmission that provides an alert that confirms the fault exists and the type of fault or indicates the fault is a false positive.

In yet another implementation, a system comprises an aircraft with sensors monitoring components on the aircraft, memory, and first processor circuitry forming at least one first processor communicatively coupled to the sensors and the memory, and being arranged to operate by: generating sensor parameter data by using the sensors, analyzing the sensor parameter data to determine if one of the components has a fault, and generating fault data in the form of a fault tree indicating the type of fault. The first processor also is arranged to operate by automatically transmitting the fault data including a fault tree code and without a user on the aircraft initiating the transmission. Also, a remote system remote from the aircraft comprises memory and second processor circuitry forming at least one second processor communicatively coupled to the memory, and being arranged to operate by: receiving the fault data and decoding the fault tree code, analyzing the fault data to confirm whether the fault data correctly indicates the type of fault exists, and transmitting instructions to the aircraft to perform or not perform an act related to the fault.

Furthermore, other desirable features and characteristics of the subject matter described herein will become apparent from the subsequent detailed description and the appended claims, taken in conjunction with the accompanying drawings and the preceding background.

BRIEF DESCRIPTION OF THE DRAWINGS

The present disclosure will hereinafter be described in conjunction with the following drawing figures, wherein like numerals denote like elements, and wherein:

FIG. 4 is a flow chart of a method of generating fault tree data on an aircraft according to at least one of the implementations described herein;

FIG. 5 is a schematic diagram of an example fault tree according to at least one of the implementations described herein;

FIG. 7 is a flow chart of a detailed method of confirming a fault determination from an aircraft according to at least one of the implementations described herein.

DETAILED DESCRIPTION

Figure 1:
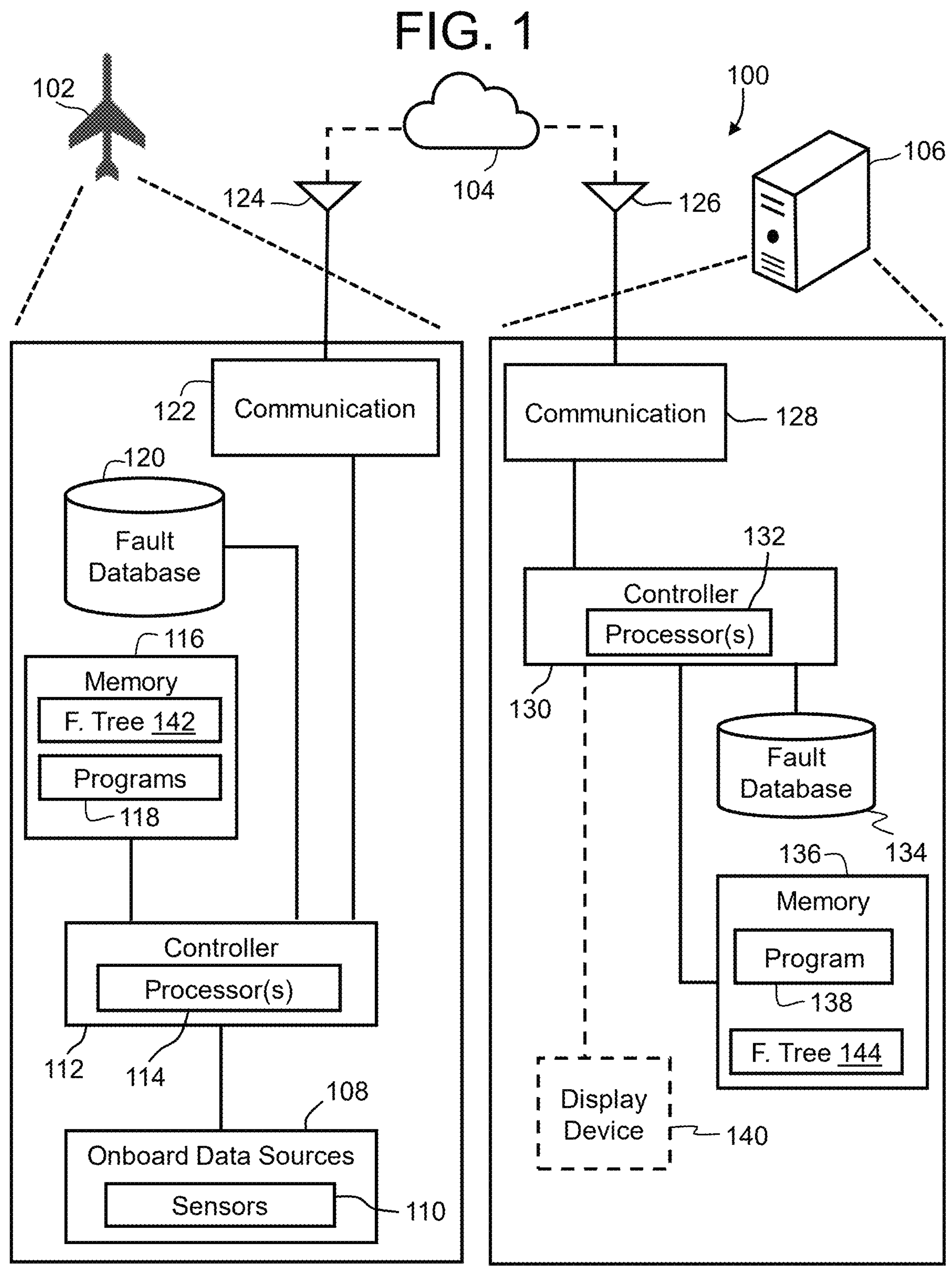
FIG. 1 is a schematic diagram of an example system to operate a method of fault detection for an aircraft according to at least one of the implementations described herein.

The following detailed description is merely exemplary in nature and is not intended to limit the subject matter of the application and uses thereof. Furthermore, there is no intention to be bound by any expressed or implied theory presented in the preceding technical field, background, brief summary, or the following detailed description.

Many current fault detection systems on an aircraft are model-based and run locally onboard aircraft cockpits such as with an Onboard Maintenance System (OMS). These model-based solutions depend on training sets of the models, and accuracy of the output of the models are probabilistic such that the accuracy can be insufficient when more accurate deterministic conclusions are desired.

Also, the fault systems can be used to detect degradation of an aircraft component in addition to a complete failure of a component, and by detecting small deviations in component parameters that extend beyond normal levels. However, when the aircraft is flying in bad weather and experiences turbulence, dense clouds, and so forth, the fault detection systems, at times, cannot detect degradation of the avionic systems and faulty systems due to the weather's impact on the aircraft. In this case, no alert or warning is provided to the aircrew when aircraft components are impacted during these climate events.

Once the aircraft detects a fault, the fault detection system may transmit the existence of the fault to a remote maintenance base on the ground. The fault detection system does not transmit the comparison, performance, and other parameter data that was used to make the fault determination. Thus, when the parameter data needs to be analyzed, such as when a comparison of parameter data from before and during a weather event needs to be compared and analyzed, this cannot be performed until after the aircraft lands. This unnecessarily increases the amount of turn-around time the aircraft needs to be on the ground when the maintenance base could have already analyzed the data while the aircraft was in flight.

Similarly, when the pilot or crew is distracted for any number of reasons, whether resting, health reasons, or others, the aircrew may miss parameter deviations that indicate degradation of an aircraft component that should be reported to the ground maintenance upon landing.

Thus, with the conventional fault detection systems, the conventional system does not accurately predict future faults or failures of the components of the aircraft, and are mainly reactive to a fault detection. The aircraft may collect the data to make such conclusions, but without transmission and analysis at the ground maintenance base, the conclusions cannot be validated and acted upon while the aircraft is in the air. Without such transmission of parameter sensor data and analysis data for validation by the ground maintenance base, false positive warnings may occur and result in the aircrew taking unnecessary actions, such as landing the aircraft. One reason for this arrangement is that the amount of data that would be needed to be transmitted to the ground for accurate sensor parameter data analysis is extremely large such that the wireless transmission bandwidth and costs related to the transmission are too great.

To resolve these issues, the disclosed system and method provides automatic transmission of fault determinations from the aircraft and to a remote system that may be located at, or is, a ground maintenance base when an aircraft component and/or aircraft system parameter readings are received from sensors on the aircraft and analyzed on the aircraft to detect a fault or predict a fault. Such aircraft components or systems may be flaps or other aircraft control surfaces, an engine, parts of the engine, and so forth. This may include detecting a failure of an aircraft component and/or detection of irregular parameter values not within normal operating ranges and that tend to indicate a future failure of an aircraft component or system.

By one example, notification of the detected fault is transmitted automatically by the fault detection system on the aircraft, and without activation by the aircrew or pilot. Also by one example, the detected fault is transmitted in the form of a fault tree code that represents a predetermined fault tree structure transmitted from the aircraft and expected by the remote system. The transmission of the notification of the detected fault in the form of a fault tree code significantly reduces the amount of bandwidth needed to report the fault to the ground maintenance so that more bandwidth capacity is available to transmit parameter data. It should be noted that herein, the term component includes any part and equipment of the aircraft as well as any system entirely or partially on the aircraft, and the term component may include software that runs avionic systems such as the autopilot, navigation systems, and so forth for an aircraft.

The transmission of the detected fault may or may not be accompanied by parameter data that was used to determine that the fault existed. However, the remote system may automatically request additional data from the aircraft while the aircraft is still in flight and remote from the remote system, and when data is missing that is needed to perform the fault analysis. Otherwise, a user at the remote system may manually activate a request for the missing data. Thus, the analysis by the remote system can occur while the aircraft is in flight thereby providing ground maintenance with a significant head start to provide a relatively fast turn-around when determining the cause of the fault and repairing the aircraft when needed, after the aircraft lands and until release of the aircraft for another flight.

With the early fault analysis by the remote system, the fault notification data and supported data can be analyzed to limit or prevent unnecessary reactions to false positive warnings, thereby lowering costs of aircraft operation while increasing safety of the aircraft by removing the need for unnecessary emergency aircraft maneuvers. Thus, once the remote system either validates the fault or determines a false positive warning occurred, the remote system then can provide instructions to the aircraft during the same flight. Thus, this arrangement improves the aircraft, or technology on the aircraft itself such that aircraft is more efficient and more reliable.

The fault analysis by the remote system provides proactive analysis by comparing parameter data received from the aircraft to historical data to identify trends in the data that predict a future failure of an aircraft component or system. The remote system also is proactive since reasons for a fault are determined and validated, and that fault analysis can be used to predict, limit, or prevent future component faults or failures.

Referring now to FIG. 1, an example aircraft maintenance communication system 100 (or just system 100) is illustrated in accordance with the example implementations herein. The system 100 includes at least one aircraft 102 and at least one remote system 106 also referred to herein as a maintenance base (or ground maintenance), and that may be or have one or more remote service units (RSUs). The aircraft 102 may include any number and type of aircraft and is not particularly limited as long as the aircraft has the systems to adequately operate the fault confirmation methods described herein.

It will be appreciated, however, that while the present examples describe the method and system herein for an aircraft, the present methods and systems may be used for vehicles other than an aircraft, such as land craft including automobiles or trucks and so forth, watercraft, and space craft, etc., as long as the vehicle has sensors for monitoring the components on the vehicle and the ability to detect a fault and transmit fault detection-related data between the vehicle and a remote system as described herein.

The aircraft 102 may include a controller 112 operationally coupled to computer-readable storage media or memory 116, onboard data sources 108 including, for example, an array of sensors 110, and a communication system 122 including an antenna 124, which may wirelessly transmit data to and receive data from various external sources physically and/or geographically remote to the aircraft 102 such as the remote system 106. The aircraft 102 may have at least one fault database 120 onboard or wirelessly accessible to the aircraft systems to store fault detection-related data as described below as well.

The remote system 106 may include a controller 130 operationally coupled to computer-readable storage media or memory 136, one or more databases including at least one remote fault database 134, a communication system 128 including an antenna 126, which may wirelessly transmit data to and receive data from various external sources physically and/or geographically remote to the remote system 106, such as the aircraft 102 and other aircraft, and optionally at least one display device 140 to display fault-related analysis as desired.

Although schematically illustrated in FIG. 1 as a single unit, the individual elements and components of the system 100 can be implemented in a distributed manner utilizing any practical number of physically distinct and operatively interconnected pieces of hardware or equipment.

The term "controller," as appearing herein, broadly encompasses those components used to perform or otherwise support the processing functionalities of the system 100. Accordingly, the controllers 112 and 130 can encompass or may be associated with circuitry forming any number of individual processors, computer-readable memories, power supplies, storage devices, interface cards, and other standardized or customized components.

In various implementations, each of the controllers 112 and 130 include processor circuitry forming at least one processor 114 and 132 respectively, a communication bus, and a computer readable storage device or media. The processors 114 and 132 performs the computation and control functions of the controller 112 or 130. The processors 114 and 132, and the controllers 1112 and 130 may form or be part of an avionic server or gateway server. The processors 114 and 132 can be any custom made or commercially available processor, a general purpose processor, a central processing unit (CPU), a graphics processing unit (GPU), a digital signal processor (DSP), an auxiliary processor among several processors associated with the controller 112 or 130, a semiconductor-based microprocessor (in the form of a microchip, chip set, system on a chip (SoC)), multiple processor cores, an application specific integrated circuit (ASIC), a field programmable gate array (FPGA) or other programmable logic device, discrete gate or transistor logic, discrete hardware components, or any combination thereof designed to perform the functions described herein. By one form, the controller 130 at the remote system 106 may have one or more processors 132 and other computing components on one or more servers, computers, laptops, desktops, and/or mobile devices such as tablets, smartphones, and so forth, and this may include cloud-based servers. In this regard, the remote system 106 may be realized as a remote maintenance data center or a distributed network of remote maintenance data centers that reside at geographic locations that are separate and distinct from one or more edge computing systems that communicate directly with the controller 112 on the aircraft 102.

The memories 116 and 136 may include computer readable storage devices or media such as volatile and nonvolatile storage in read-only memory (ROM), random-access memory (RAM), flash memory, registers, and cache. The computer-readable storage device or media may be implemented using any of a number of known memory devices such as PROMs (programmable read-only memory), EPROMS (electrically PROM), EEPROMs (electrically erasable PROM), flash memory, or any other electric, magnetic, optical, or combination memory devices capable of storing data, some of which represent executable instructions, used by the controller 112 or 130. The bus serves to transmit programs, data, status and other information or signals between the various components coupled to the controller 112 or 130. The bus can be any suitable physical or logical means of connecting computer systems and components. This includes, but is not limited to, direct hard-wired connections, fiber optics, infrared, and wireless bus technologies.

The executable instructions may include or establish one or more separate programs, each of which comprises an ordered listing of executable instructions for implementing logical functions. The instructions, when executed by the processor, perform logic, calculations, methods and/or algorithms, and generate data based on the logic, calculations, methods, and/or algorithms. Although only one of each of the controllers 112 and 130 are shown in FIG. 1, implementations of the system 100 can include any number of controllers 112 and 130 that communicate over any suitable communication medium or a combination of communication media and that cooperate to perform logic, calculations, methods, and/or algorithms, and generate data. In various implementations, the controllers 112 and 130 each includes or cooperates with at least one firmware and software program (generally, computer-readable instructions that embody an algorithm) for performing the various process tasks, calculations, and control/display functions described herein. During operation, each of the controllers 112 and 130 may be programmed with and execute at least one firmware or software program. A program 118 may be a fault classification application operated by the controller 112 and a program 138 may be a fault confirmation application operated by the controller 130 and that embodies one or more algorithms, to thereby perform the various process operations, tasks, calculations, and control/display functions described herein. The memories 116 and 136, or the fault databases 120 and 134, may store fault tree structure templates 142 and 144 respectively, that are the same or sufficiently similar to organize fault data for consistent use by the fault classification application 118 and the fault confirmation application 138 respectively at the aircraft 102 and remote system 106.

Each of the controllers 112 and 130 may exchange data with one or more external sources to support operation of the system 100 in various implementations. In this case, bidirectional wireless data exchange may occur via the communication systems 122 and 128 over a communications network 104, such as a public or private network implemented in accordance with Transmission Control Protocol/Internet Protocol architectures or other conventional protocol standards. Encryption and mutual authentication techniques may be applied, as appropriate, to ensure data security.

In various implementations, each of the communication systems 122 and 128 are configured to support instantaneous (i.e., real time or current) communications between various systems. The communication systems 122 and 128 may each incorporate one or more transmitters, receivers, and the supporting communications hardware and software required for components of the system 100 to communicate as described herein. The network 104 used for communication may be a wireless gateway such as a data link management wireless (DLM-W) system that provides communication among systems within a cockpit and on an aircraft as well as transmission between the aircraft and the ground, Aircraft Communication Addressing and Reporting System (ACARS), which uses VHF, HF, or satellite communication (SATCOM) (whether via Wi-Fi or other network), VHF Data Link (VDL), High-Frequency Data Link (HFDL), and air-to-ground (ATG) systems. Other networks may be used when the aircraft 102 is on the ground such as cellular networks and ground Wi-Fi Networks while an aircraft is at a gate, taxiing, or at a remote location on the ground from a specific maintenance base. Any combination of these may be used. In various implementations, one or both the communication systems 122 and 128 may include additional communications not directly relied upon herein, such as bidirectional pilot-to-ATC (air traffic control) communications via a datalink, and any other suitable radio communication system that supports communications between the aircraft 102, the remote system 106, and various external source(s).

Each of the memories 116 and 136 can encompass any number and type of storage media suitable for storing computer-readable code or instructions, such as the programs 118 and 138, respectively, as well as other data generally supporting the operation of the system 100. As can be appreciated, each of the memories 116 and 136 may be part of their respective controller 112 or 130, separate, or both.

The fault databases 120 on the aircraft 102 may store fault tree structure templates and/or previously generated fault trees (and/or fault tree codes), a listing (or mapping) of which one or more parameters indicate an individual fault type, and any other data related to generating the fault trees, if not stored on memory 116. A performance database (PERFDB) may be considered part of the fault database 120 or as a separate database. The performance database includes performance or history data regarding parameters of the components being monitored by the sensors 110.

Additionally, the fault databases 134 at the remote system 106 may store fault tree templates and structure, and previously generated fault trees (or more precisely fault tree codes), and may be referred to as a fault tree database. The fault databases 134 also may include a parameter database that lists which parameters are needed to determine a specific type of fault provided by a fault tree code as well as a fault prediction database that has historical incident database and a performance database with trend data for components on the aircraft 102. The fault databases 134 also may include (or provide access to) a maintenance database of maintenance records for the aircraft 102 and components thereof. When the databases 120 and 134 are to contain the same data, the databases may be updated similarly.

Otherwise, the aircraft 102 and remote system 106 may have one or more other databases (not shown) that may be employed to receive and store data related to the operation of the aircraft in addition to the performance database, such as a weather database, a navigation database, and so forth. Any of the databases mentioned herein may be updated on a periodic or iterative basis to ensure data timeliness. In various implementations, any of these databases may be available online and accessible remotely by a suitable wireless communication system, such as the communication systems 122 and 128.

The onboard data sources 108 supplies various types of data and/or measurements to the controller 112. In various implementations, the onboard data sources 108 sense operating conditions of various one or more parts, components, equipment, and systems of the aircraft 102. As an unlimited list, the sensors 110 (or sensor system) may be used to monitor engines (manifolds, turbines, fuel delivery, vibration levels), hydraulic systems (pressure levels, fluid flow, control surfaces such as flaps, landing gear, and brakes), fuel systems (fuel pressure, flow rate, moisture levels), environmental control systems (cabin pressurization, airflow, oxygen levels), flight control systems (position of ailerons, elevators, rudders, flaps), landing gear (retraction, position, hydraulic pressure), electrical systems (voltage, current levels, potential leaks, smoke detection), cabin and cockpit (oxygen levels, smoke, fire, temperature, passenger comfort systems, electronic passenger communication and entertainment systems, and so forth), avionics and airframe (vibration, corrosion detection, temperature, fluid leaks), and emergency oxygen systems (oxygen flow). Others not listed here may be used as well.

Otherwise, in various implementations, sensors 110 also may be used for aircraft motion control and navigation. In this case, the sensors 110 supplies, without limitation, one or more of: inertial reference system measurements providing a location, Flight Path Angle (FPA) measurements, airspeed data, groundspeed data, vertical speed data, vertical acceleration data, altitude data, attitude data including pitch and roll measurements, yaw data, data related to ownship weight, time/date information, heading information, data related to atmospheric conditions, flight path data, flight track data, radar altitude data, geometric altitude data, wind speed and direction data.

The type of sensors 110 providing data on the aircraft to perform the monitoring may include temperature sensors (thermocouples, resistance temperature detectors, infrared sensors), pressure sensors (manifold pressure sensors, fuel pressure sensors, hydraulic pressure sensors, cabin pressure sensors), vibration sensors (accelerometers, piezoelectric sensors), flow sensors (fuel flow sensors, airflow sensors, oil flow sensors), position sensors (potentiometers, linear variable differential transformers, rotary encoders), proximity sensors (inductive sensors, capacitive sensors, optical sensors), oxygen sensors (oxygen depletion sensors, oxygen flow sensors), voltage and current sensors (voltage sensors, current sensors), leak detection sensors (fluid leak sensors, gas leak sensors), smoke and fire sensors (smoke detectors, heat sensors), and chemical sensors (corrosion detection sensors, moisture sensors). Others may be used that are not listed here.

The term sensor (and in turn the sensor data unit 212) includes software diagnostic applications in addition to mechanical or physical sensors. Thus, a continuous monitoring application or system, or a built-in-test (BIT) type of application, may be referred to as, or included as, sensors for the purposes of describing the present application herein. Thus, the monitoring of avionic systems such as the autopilot, navigation, and/or flight management systems (FMS) to name a few examples may be monitoring real-time task execution, CPU loads, memory usage, data integrity, error logging, redundancy management, and so forth, in addition to providing expected parameter values to be compared to actual parameter values generated from physical sensors on aircraft physical components.

The system 100 operates two programs. This includes the fault classification application or unit 200 (FIG. 2) on the aircraft 102 that operates a fault classification process 400 (FIG. 4). The fault classification process 400 generates a fault tree indicating a type of error as well as parameter data used to generate the fault tree. A fault confirmation application or unit 300 at the remote system 106 operates fault confirmation processes 600 and 700 (FIGS. 6 and 7) to confirm the fault indication received from the aircraft. The unit 300 also may be involved in transmitting requesting more data from the aircraft, and transmitting instructions upon confirming a fault or a false positive. The unit 300 also may be used to predict future failures of components on the aircraft 102. The details are as follows.

Figure 2:
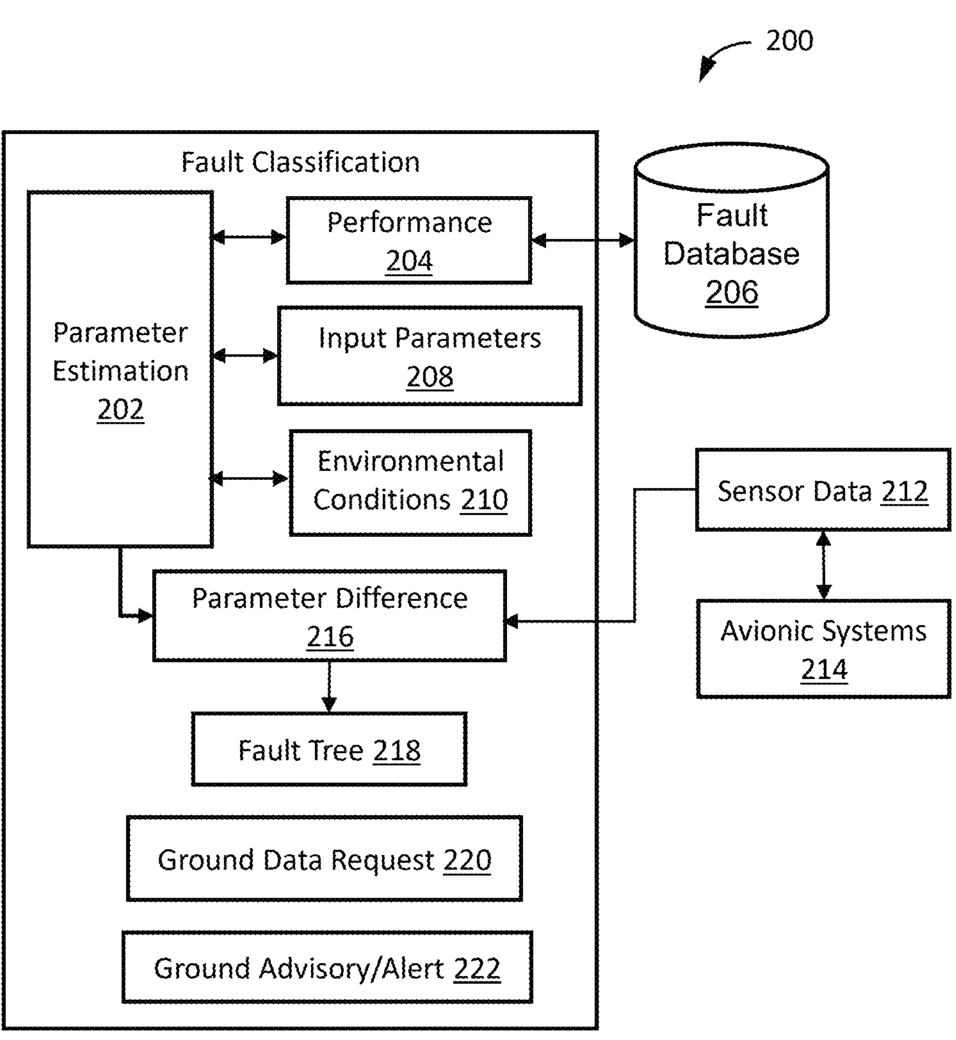
FIG. 2 is a schematic diagram of an example fault classification confirmation unit on an aircraft for the system of FIG. 1 according to at least one of the implementations described herein.

Referring to FIG. 2, the program 118, which here is the fault classification confirmation unit or application 200, has a parameter estimation unit 202, and a performance unit 204 that accesses a fault database 206 including a performance database in this example. The performance unit 204, as well as an input parameters unit 208 and environmental conditions unit 210 provide data to the parameter estimation unit 202. The performance unit provides performance history data such as parameter values over time so far for a component on the aircraft and that indicates the state of the aircraft when a fault was detected at other times. The input parameters unit 208 may provide the control or command settings of the components on the aircraft at a current time, a time of the fault, or other desired time or duration. The environmental conditions unit 210 provides the current weather or climate data, such as ambient temperature and pressure, moisture (rain), wind, and so forth, as well as parameter data to determine if a parameter setting is due to the climate or a faulty component. The parameter estimation unit 202 uses this data and generates expected parameter values for parameters that can indicate a fault of the components on the aircraft 102.

These expected parameters are compared to actual parameter values, both of which are also referred to herein as basis parameters whether as expected or actual parameters. The sensors 110 monitor avionic systems 214 (including the components on the aircraft 102) and generate sensor data 212, which is used as, or converted into, actual parameter data. A parameter difference unit 216 determines the differences between expected and actual parameter values, and this may include parameters for physical sensors as well as software diagnostic applications monitoring the health of the software avionic systems. When the difference between one or more expected and corresponding actual parameter values is above a threshold, this indicates a fault exists, and a fault tree unit 218 may generate a fault tree code that indicates the type of fault. This may be based on a single parameter, or a combination of the parameters predetermined to indicate a certain type of fault. The mapping of the combinations of parameters that indicate a fault for the fault tree may be stored in the fault database 206. The fault tree code as well as fault basis parameter data may be transferred to the remote system 106. The fault classification confirmation unit 200 also may have a ground data request unit 220 that receives and fulfils remote requests for more data, which may include missing or additional parameter data values, and a ground advisory/alert unit 222 that receives confirmation of a fault and instructions to respond to the fault at the aircraft or ignore the fault when the fault is found to be a false positive.

Figure 3:
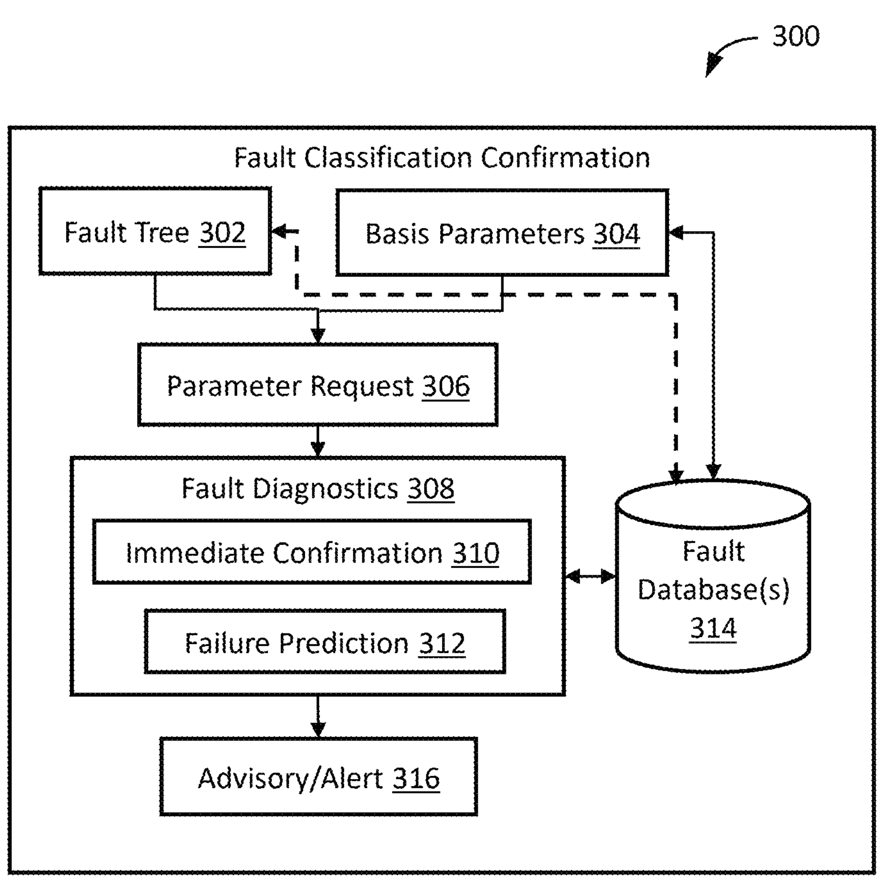
FIG. 3 is a schematic diagram of an example fault classification confirmation unit of the system of FIG. 1 and at a system remote from an aircraft according to at least one of the implementations described herein.

Referring to FIG. 3, a fault classification confirmation unit 300 is at the remote system 106 and receives a fault tree code at a fault tree unit 302 and that decodes the fault tree code to determine which fault type is indicated. This is performed by using a fault tree template and analysis data from the fault database 314. Any basis parameter data received from the aircraft and associated with a specific fault tree are provided to a basis parameters unit 304. The basis parameters unit 304 uses the fault database 314 to store a parameter database with a listing of which parameters indicate an individual fault type to determine whether any basis parameter data is missing that is needed to confirm the accuracy of the indicated fault. When basis parameter data is missing, a parameter request unit 306 automatically activates a transmission back to the aircraft 102 to retrieve the missing basis parameter data. The request can be activated by a user as well. When all data needed to confirm a fault indication is received at the remote system 106, a fault diagnostics unit 308 then analyzes the fault indication and basis parameters, as described below. The fault diagnostics unit 308 may have an immediate confirmation unit 310 for when time is important and an aircraft needs the confirmation in a sufficient amount of time for the aircrew to make decisions and drive the aircraft appropriately. In this case, the unit 300 is arranged to attempt to provide instructions back to the aircraft in time for a pilot to react to the fault or prevent an unnecessary action upon a false positive. The fault diagnostics unit 308 also may have a failure prediction unit 312 that analyzes parameter data trends that can indicate a future failure of a component on the aircraft 102. The fault diagnostics unit 308 may perform the analysis by using performance data, historical incident data, and maintenance records obtained from the fault database 314 or other database or memory. An advisory/alert unit 316 then generates an appropriate alert to transmit to the aircraft and warn the aircrew if the fault is confirmed, or a message to ignore the fault (if the fault is already notified to the aircrew) when the fault is found to be a false positive.

Referring now to FIG. 4, a process 400 for indicating a fault type at an aircraft is described according to at least one of the implementations herein. The process 400 includes operations 402 to 422, generally numbered evenly. Systems, device, modules, units, and fault trees of any of FIGS. 1-3 and 5-7 may be referred to describe process 400, where relevant.

Process 400 may include "monitor aircraft components" 402, and as described above, the sensors 110 on an aircraft 102 may be monitoring many different components of the aircraft (such as parts, equipment, and systems including avionic system software) as mentioned in detail above. To mention a few random examples, the sensors may be monitoring airspeed, altitude, pitch angle, roll rate, vertical speed, engine RPM, etc. to indicate the current (or other set time instant) state of the aircraft.

Process 400 may include "extract sensed parameter values" 404, where raw sensor signals are stored and converted into parameter values where needed, and this may be performed by the sensor unit 110 itself or other units on the aircraft 102. For one example, a thermometer signal may be converted into a digital temperature parameter value for use in diagnostic or health algorithms as well to display to a user. For some actual parameters, the sensor signal levels may be used as the parameter directly.

Process 400 may include "generate expected parameters" 406, and this operation collects data from various sources to determine the correct expected parameter in the same categories mentioned above for the actual parameters. This operation includes "use performance data from a fault database" 408, or PERFDB at fault database 206, which is the same as fault database 120. Thus, a performance database as described above may have historical parameter data that indicates parameter settings that should be achieved in particular situations such as an aircraft state and cockpit control settings (for example, the throttle, flaps setting, and so forth). This operation 406 also then may include "obtain aircraft control inputs" 410, where the input parameter unit 208 may provide the control or command settings at the time of the fault or other significant time or duration for the fault detection. This can be obtained from sensors (including diagnostic software systems) that are continuously monitoring the cockpit commands, for example. The input parameters also may be aircraft state parameters. Generally though, the aircraft state parameters are the expected or actual result of the cockpit control parameters.

As another example aspect, the operation 406 has the environmental conditions unit 210 to "factor environmental conditions" 412 to generate the expected parameters. Thus, for the given flight, atmosphere conditions such as temperature, ambient pressure, moisture, humidity, and so forth are factored to determine if the aircraft is flying in or towards a weather condition that can affect the flight of the aircraft with a sufficient amount of severity that outlier parameter values may be due to the climate rather than a faulty component. By one form, environmental conditions unit 210 may collect actual sensed parameter values before the aircraft flies into a climate event (e.g., bad weather), and then during and/or after the climate event. The fault data collected before the climate event can be compared to the parameter levels collected during or after the climate event to determine whether the climate event caused a change in a parameter level rather than a fault. In this case, the environmental condition unit 210 may determine to activate the fault sensor data collection before the climate event by obtaining aircraft weather sensor data and/or communications with external and/or onboard weather systems that indicates an upcoming climate event exists, and if not already being performed, activates continuous fault sensor monitoring before, during, and after the climate event to collect parameter data to compare to any parameter value that extends out of acceptable ranges during the climate event. As another example, for a particular single parameter or sensor type, the environmental conditions unit 210 may have historical environmental conditions data for the single parameter that can reveal whether the value of the single parameter is due to the climate or a fault. Otherwise, a set of parameters may have historical (or stored) values that confirm a certain climate condition exists, and including the expected value of the single parameter in the climate condition.

With at least these three sets of data (the performance data, input control/command data, and environmental data), the expected parameter values can be determined as indicated by the performance data and input control/command data and then adjusted for environmental conditions.

The expected parameters and corresponding actual parameters are then provided to the parameter difference unit 216 to "compare the expected parameter to the sensed parameter" 414, and the process 400 performs the inquiry "difference greater than a threshold?" 416. The thresholds may be determined for each parameter by experimentation. Also, as explained below, their may be two levels of thresholds when desired, a higher threshold that indicates a fault has occurred, and a lower threshold that indicates a small deviation in parameter level is an outlier and raises a concern that should be monitored to determine if a future fault can be predicted.

By the example form described herein, a fault data transmission for the methods described herein and to the remote system 106 at a ground maintenance base will occur, and by one example form will only occur, when a fault or sufficient parameter deviation is detected and triggers a transmission. This reduces the bandwidth requirements for such transmissions. By other examples, parameters may be transmitted to the ground or remote system continuously or at intervals regardless of any fault diagnostics or related analysis.

Also by one example form described herein, when it is determined that a fault exists, the indication of a fault type is formatted into a fault tree code to be transmitted. In this case, the fault tree code may be transmitted without other fault related data, or the fault tree code may be transmitted with basis parameter data including the expected parameter data, the actual parameter data, or both as well as any other data related to generating and comparing the parameters.

Figure 5:
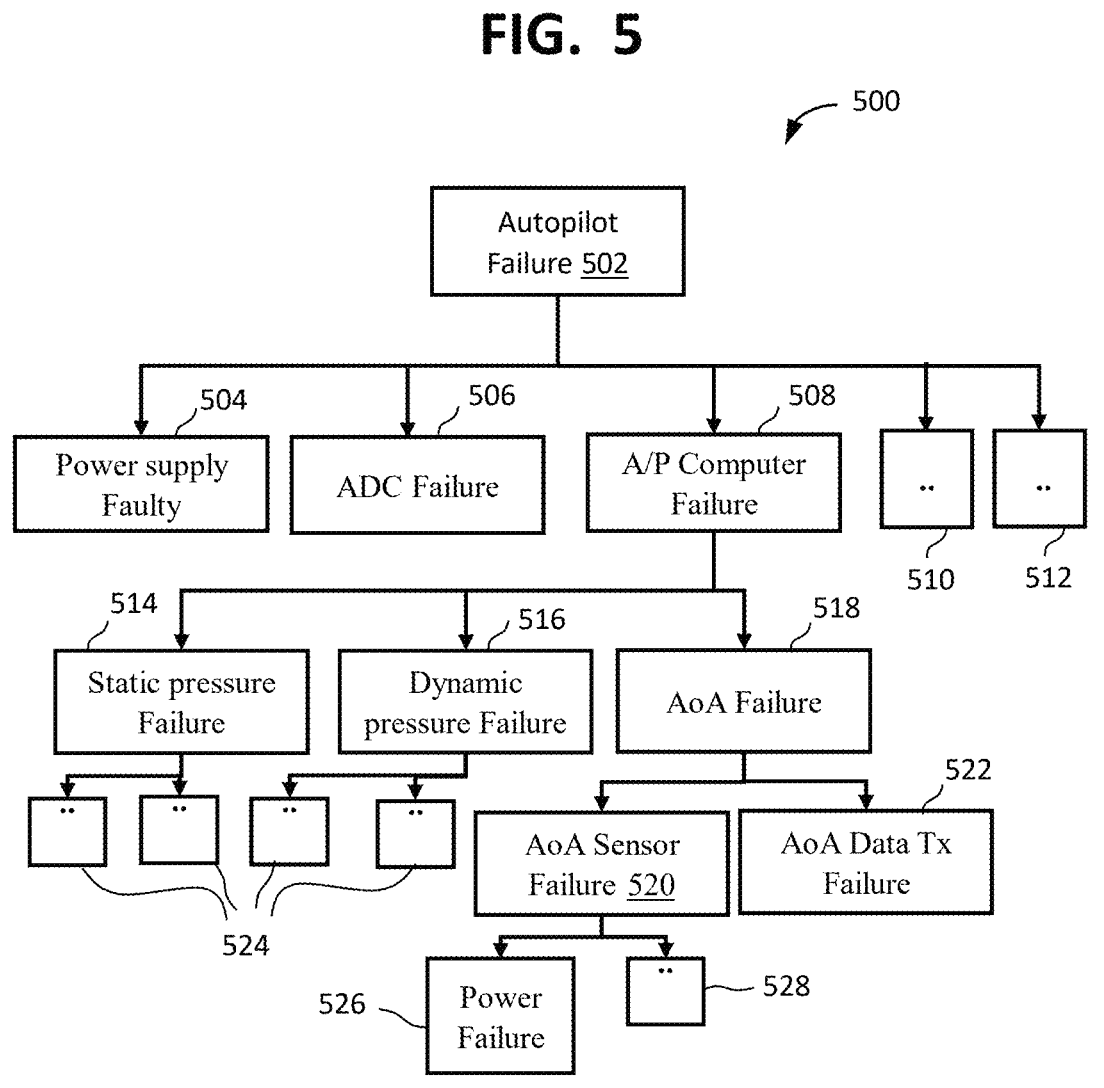

Thus, while referring to FIG. 5, process 400 may include "generate fault tree" 418. A fault tree 500 is a top-down, hierarchical structure used to systematically analyze the causes of system failures. It begins with a main root node or top event node 502 that represents the main or overall system failure or fault that is being analyzed. The top event node 502 branches out into child nodes or intermediate event nodes (or just intermediate events) 504 to 522 numbered evenly, each representing subsystems or sub-components that can contribute to the top event failure. These intermediate nodes 504 to 520 can further branch out into more specific causes or components, creating a tree structure and terminating at basic events (or leaf nodes) 522, 524, 526, and 528. The basic events represent the most specific causes of failure, such as individual component failures, environmental conditions, or human errors. Basic events are the end points in the fault tree. The logical operators connecting the gates may be AND or OR gates, or other operators. An AND gate implies that all conditions or failures in the child nodes must occur for the parent node to fail, while an OR gate indicates that any one of the child node failures can cause the parent node to fail. This hierarchical breakdown continues until you reach the basic events. By analyzing the fault tree from the root down to the leaf nodes, you can trace the sequence of failures or errors that lead to the system fault. This structured approach helps in identifying the root cause and understanding the interactions between different subsystems and components, enabling more targeted and effective mitigation strategies. Line replaceable units (LRUs) equipment and/or shop replaceable units (SRUs) equipment related to the failed system can be traced through the fault tree, and the exact branch that failed can be determined.

The failed node can be verified by validating multiple outputs from the failed system and can be confirmed to the aircrew. By one form, the aircrew is only informed of a fault, and may be provided with data of the fault tree indicating the reason for the fault. This notification may or may not be in the form of the fault tree itself, and may take other forms such as a message on a display device in the cockpit. When small parameter deviations are detected less than a fault, by one form, these deviations are assumed to be long term maintenance issues and the aircrew does not need to be informed about them. Thus, in this case, the parameter deviations may be transmitted to the ground but are not provided to the aircrew. Alternatively, the aircrew may get notifications of the relatively small parameter deviations as well.

In the present example of fault tree 500, the top event 502 is an autopilot failure, and this has first level branches of direct possible intermediate events of power supply faulty 504, air data computer (ADC) failure 506, autopilot (A/P) computer failure 508, and others numbered as 510 and 512. As shown, the tree 500 continues from the A/P computer failure node 508 indicating this was a higher level cause of the failure or fault. Branching from the A/P computer failure node 508, second level possible intermediate events include static pressure failure 514, dynamic pressure failure 516, and angle of attack (AoA) failure 518. The fault tree 500 shows possible basic events 524 branching from the static pressure failure node 514 and dynamic pressure failure node 516, but end there indicating the fault is not in this technology area. Instead, the AoA failure node 518 has third level branches of AoA sensor failure 520 and AoA data transmission (Tx) failure 522, the latter ending as a basic event. The basic event cause of the fault, however, is a fifth level branch from the AoA sensor failure node 520 and indicates a power failure (or power failure basic event or leaf node) 526. It will be understood that the fault tree may have many different structures, and a fault tree for an entire aircraft may be extremely large such that it is inefficient to transmit the entire fault tree each time a fault is detected. Even transmitting a small part of an entire fault tree, as represented by fault tree 500, may be too much data to efficiently transmit to the ground.

In the example implementation then, one or more identical, or substantially the same, fault tree templates may be stored on both the aircraft and the remote system, such as at their respective fault databases 120 and 134 for example. The aircraft and remote system templates are fixed, but should be updated with the same template structure data. Also, instead of transmitting the fault tree itself from the aircraft to the remote system, the fault tree is encoded into a fault tree code that indicates the existence of the fault and the type (or cause) of the fault.

The fault tree code format may have several different arrangements, but largely is provided to reduce transmission bandwidth consumption or usage for transmitting fault data with reduced costs. A fault tree may be transmitted separately for each top event failure, which may be indicated by a flag or notification (not shown) separately from the fault tree code. Alternatively, if the fault tree is extremely large in number of levels (vertically), multiple codes may be sent for a single fault, and each fault tree may refer to a lower level intermediate event not represented on the fault tree itself instead, but that indicates the start of a next fault tree code. Other variations with an intermediate event indicating a start of a fault tree code may be used instead.

By the example form provided below, the fault tree code (also referred to as a downlink format) is a single variable-sized binary word (or field) with a header, here shown as '98' that indicates a fault order number (so the 98*th* fault code). Each single bit location then represents each detected failure identification along a sequence of sub-failures. The first level intermediate nodes directly 'above' the root or top event starts closest to the header on the left and continues through sub-levels of the tree until the end on the right represents the basic event levels and indicate which basic event node has the failure. Each bit location shows a child sub-system failure to the right of the parent sub-system failure. The length of the fault tree code may vary depending on the structure of the tree and the indicated and detected fault. Once the fault tree code is populated with the fault data indicators or flags, the fault tree code may transmitted to the remote system. In this example fault tree code, the code is 9 bits not including the header number.

Example Fault Tree Code

| Failure | Power Supply | ADC | A/P | Static Pressure | Dynamic Pressure | AOA | AOA Sensor | AOA Data Tx | Power Failure |
|---|---|---|---|---|---|---|---|---|---|
| 98 | 0 | 0 | 1 | 0 | 0 | 1 | 1 | 0 | 1 |

It will be understood that the fault tree code may be larger or smaller when desired and with more bits at each failure node to represent more information when desired, or to represent a larger section of the fault tree including multiple designated top events for example. This may be provided when an entire fault tree is to be represented by the fault tree code. Many other variations of the format of the fault tree code exist. Once the fault tree code is populated, it is ready to be transmitted to the remote system on the ground or other location.

By another example alternative, process 400 may include "obtain basis parameters" 420. By this example approach, the basis parameter data used to determine whether the fault exists and the identification of the type of fault can be transmitted with (or separately from) the fault tree code to be used at the remote system. This may involve transmitting all basis parameter data used for the fault detection and identification, or just certain types of basis parameter data, such as only the nth most directly involved parameters with the error in order to limit bandwidth usage. Otherwise, no basis parameters may be sent with the fault tree code, and the remote system is expected to request any further basis parameter data that it requires to confirm or predict a failure. The request from the remote system may be performed automatically or manually as described in detail below with process 700.

Process 400 may include "transmit tree and/or parameters" 422, where the fault tree code and/or basis parameter data is transmitted to the remote system on the ground or other location. In alternatives mentioned above, small deviation parameter data may be transmitted as well and may or may not be transmitted with a fault tree code. By one form, the data communication with the remote system is through SATCOM or other communication systems mentioned above or any other communication channel with a unique call sign or flight ID.

Figure 6:
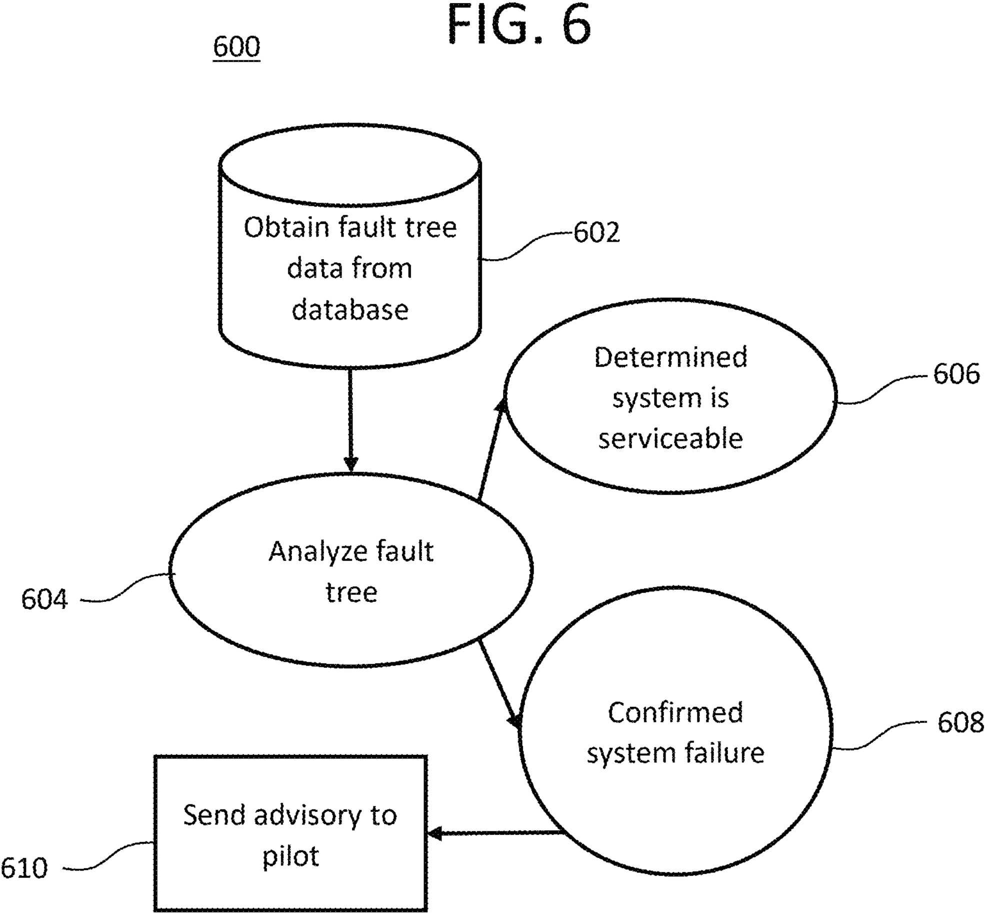
FIG. 6 is a flow chart of an overview method of confirming a fault determination from an aircraft according to at least one of the implementations described herein.

Referring to FIG. 6, an example overview process 600 for confirming a fault type received at a location remote from an aircraft is described according to at least one of the implementations herein. The process 600 includes operations 602 to 610, generally numbered evenly. Systems, device, modules, units, and fault trees of any of FIGS. 1-3 and 5 may be referred to for process 600, where relevant. More details are provided with process 700 (FIG. 7).

Process 600 may include "obtain fault tree data from database" 602, and obtaining the correct fault tree template so the fault tree code from the aircraft can be analyzed. The fault tree code transmission may have an identification accompanying the fault tree code that identifies which fault tree or which part of a fault tree is being represented by the fault tree code.

Process 600 may include "analyze fault tree" 604, here the fault tree code received from the aircraft is decoded and analyzed to identify the fault type, and confirm the fault exists. This may use parameter data received from the aircraft as well as performance, historical incident, and maintenance data as data source from a fault database. Whether at the aircraft alone, at the remote system, or both, this operation also may include testing of the failed component when available and by determining the validity of the sensor signal used, and the availability of the sensor signal. Otherwise, this operation is to confirm whether the basis parameters are within acceptable tolerances or limits defined (as already described above), and may use other actions that indicate the fault of a specific component exists not listed here.

When evidence of the fault cannot be corroborated and the fault is a false positive, then the process 600 concludes with "determined system is serviceable" 606, and the monitoring process on the aircraft continues as described above. If an aircrew or pilot was warned of the fault, then a false positive message is transmitted to the aircraft to ignore the fault warnings and to avoid actions to compensate for, or correct, the false positive fault.

Otherwise, as mentioned herein the analysis operation 604 may be used proactively to determine future faults. In these cases, the remote system may or may not warn an aircrew during a flight depending on the criticality of the type of fault and the urgency or predicted timing of the future fault.

When the fault is confirmed, then the process 600 may include "confirmed system failure" 608, and the process 600 may include "send advisory to pilot" 610 to warn the pilot and provide the pilot with instructions for immediate action to compensate for the fault or apply corrections on the aircraft to fix the fault when possible. As mention the process 600 attempts to provide instructions in time for an aircrew to act to reduce the risk of harm and maintain an efficient flight.

Referring to FIG. 7, an example process 700 for confirming a fault type received at a location remote from an aircraft is described according to at least one of the implementations herein. The process 700 includes operations 702 to 732, generally numbered evenly. Systems, device, modules, units, and fault trees of any of FIGS. 1-3 and 5-6 may be referred to for process 700, where relevant. The left column of the flow chart of process 700 are operations performed at the remote system, while the right column of the flow chart of process 700 shows operations performed on the aircraft. The dashed arrow lines represent transmissions between the remote system and the aircraft.

Process 700 may include "receive fault tree and/or irregular parameters" 702. This operation involves receiving the fault data transmission from the aircraft by SATCOM or other communications system as mentioned above. Also as mentioned as one example, such fault data transmission may be made only when the aircraft detects a fault, but otherwise the aircraft does not continuously transmit parameters to the remote system solely for fault analysis. Other alternative arrangements may be used instead. Also, while the process 700 discusses a single remote system, as mentioned above, a single gateway or edge remote system may first receive data from the aircraft but then spread the data and/or use multiple remote systems to perform the analysis mentioned herein.

Process 700 may include "determine fault classification" 704. Here, the fault data transmission may include the fault tree code and that is received by the fault tree unit 302. The tree code unit then decodes the fault tree code, retrieves the fault tree template from the remote fault database 314 (or 134), and identifies the type of fault indicated in the decoded fault tree.

By one implementation, the fault data transmission also includes basis or irregular parameters that were used at the aircraft to determine the fault exists and the type of fault. Thus, by one form at least the actual parameters were transmitted, and by some forms, the expected parameters were transmitted as well. The transmitted parameters are provided to the basis parameters unit 304.

By yet another alternative, small deviation parameters (or more precisely parameter values) are transmitted regardless of the presence of a fault and when detected at the aircraft as mentioned with process 400. This may occur when a fault is not detected but the parameter deviation or irregularity still passes minimum thresholds that may indicate a future failure of an aircraft component. These small deviation parameters also may be provided to the basis parameters unit 304 when received by the remote system.

Process 700 may include the inquiry "parameters missing?" 706. When the fault classification or type is identified, the basis parameters unit 304 may determine which parameters should be used to confirm the existence of the fault, and the listing of which parameters are to be used may be in a parameter database as part of the fault database 314 (or 134). At this point, whether all of the basis parameters are present at the remote system to confirm the existence of the fault type may be performed manually or automatically. By one form, a user at the remote system location, or that has access to the remote system, may manually compare the parameters needed on the list from the database to the basis parameters received from the aircraft (or see an automatic comparison). The user also may have experience or other sources that indicate which parameters should be used to confirm a particular fault. In this case, the user may activate a transmission back to the aircraft with a request for specific parameter data. By one example form, the user may use this system to request any desired parameter data from the aircraft, even parameter or sensor data unrelated to the fault when desired. The format of the request may be predetermined on the remote system and as expected by the aircraft.

By another alternative, the remote system 106 may automatically compare the list of parameter data that should be used to confirm the fault to the parameter data already received from the aircraft. If parameter data is missing, then an automatic activation of a request for the missing parameter data is performed to automatically sent the request back to the aircraft.

Process 700 may include "transmit request for missing parameters" 708, where the request is transmitted back to the aircraft 102 for example, and by communication systems already described above.

Process 700 may include "receive request for missing parameters" 710 and at the aircraft 102. Upon receiving the request from the ground maintenance base or remote system 106, process 700 may include "retrieve missing parameters" 712, where the ground data request unit 220 of the fault classification confirmation unit or program 200 then obtains the requested data from memory or databases or otherwise obtains current sensor data to fulfil the request when that is appropriate.

Process 700 then may include "transmit parameters to ground maintenance" 714, which may be activated by the ground data request unit 220. The requested data is then transmitted down to the remote system 106 or other location for the fault diagnostics.

At the aircraft, process 700 may include "receive missing parameters" 716, and by communications systems mentioned above and by the fault diagnostics unit 308 to "perform fault diagnostics" 718. For process 700, this first includes "determine immediate confirmation for aircraft in flight" 720, and this may be performed by immediate confirmation unit 310. Thus, data is collected to perform the analysis, such as the basis parameters, which should now include the requested parameters. This may include the fault tree, the indicated fault type on the fault tree, at least the relevant minimum types of basis parameters needed to make a fault decision and that is less than all basis parameter types that can be used to make a fault decision. The collected data also may include performance data from a performance database and a historical incident database (if separate from the performance database) of the fault database 314 (or 134)

or other memory, and relevant maintenance records of the aircraft and from the fault database 314 (or 134) or other memory.

The fault diagnostic unit 308 then analyzes the fault tree and compares basis parameter data received from the aircraft to the performance, historical, and maintenance record data to determine if this data indicates the fault exists. This can involve cross-checking performance data to confirm the parameter values are out of normal range, searching for trend analysis of the parameter values to find gradual degradation of a component, and checking for anomalies in other systems that could have caused the fault. The maintenance records may be used to determine recent replacement suggesting faulty new parts or maintenance errors may have caused the fault, and with the historical incidents data whether the fault is a recurring problem and has happened before. Otherwise, historical incidents on other similar aircraft may reveal this type of fault has happened. Also, service bulletins, manufacturer updates, or recalls may be relevant to confirming the fault. These different data sources, combined, may provide multiple points for confirming the fault and the type of fault. Conversely, when the fault cannot be corroborated by any of the data sources, this may indicate a false positive.

Process 700 may include "predict failure" 724, and this may be performed by the failure prediction unit 312, where here the fault data including the fault tree and basis parameters may be used to predict other faults, and/or the small deviation data may be used to predict a fault when no fault has been indicated yet. In either case, the failure prediction unit 312 can collect the same data as mentioned for the immediate fault detection, and may include use of other maintenance dumps of similar aircraft and the incident history details. By one form, the fault type (if provided), basis parameters or small deviation parameters, as well as the relevant source data may be input into a neural network or other machine learning algorithm. By one example form, this operation may include inputting at least one of: the fault data, basis parameter data that was used to determine the fault data at the aircraft, performance data, historical incident data, and maintenance records into the neural network.

The neural network may be a recurrent neural network (RNN) model by one example. The neural network may have many different architectures as desired. The neural network may be trained on the historical data and maintenance data of the aircraft or many aircraft over long periods of time (such as years) to output accurate failure predictions. Thus, the neural network considers past incidents and maintenance issues for the particular aircraft, and by one option, may be trained based on a fleet of aircraft. This proactive technique can save significant costs for repairing the aircraft (when a fault indicates more damage has been done than if a degradation in a component had been detected earlier) as well as increase the safety of the aircraft.

Process 700 may include "generate advisory/alert" 726, and where a fault is confirmed, the advisory/alert unit 316 transmits the appropriate alert or warning to the aircrew on the aircraft along with instructions on the appropriate actions to take in response to the fault. Thus, process 700 may include "transmit advisory/alert" 728.

Process 700 also may include "receive advisory/alert" 730 and by the ground advisory/alert unit 222 that receives the alert from the ground or remote system 106. The process 700 may then include "act according to advisory/alert" 732, where the pilot executes an appropriate action whether manually or by activating the autopilot or other avionic systems as appropriate. This also may be tasks to fix the fault on the aircraft when that is possible. Otherwise, when a false positive is determined, the advisory/alert is a message to ignore the fault and avoid actions regarding the fault as already explained above.

Process 700 also may include "store maintenance plan" 734, where a record of the required maintenance to be performed on the ground when the aircraft lands or that is, or was, performed in the air by the aircraft crew is recorded along with any other relevant data to go into the performance database, the historical incident database, and so forth.

Those of skill in the art will appreciate that the various illustrative logical blocks, modules, circuits, and algorithm operations described in connection with the implementations disclosed herein may be implemented as electronic hardware, firmware, computer software, or combinations of both. Some of the implementations and implementations are described above in terms of functional and/or logical block components (or modules) and various processing operations. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and operations have been described above generally in terms of their functionality. Whether such functionality is implemented as hardware, firmware, or software depends upon the particular application and design constraints imposed on the overall system. Skilled artisans may implement the described functionality in varying ways for each particular application, but such implementation decisions should not be interpreted as causing a departure from the scope of the present invention. For example, an implementation of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that implementations described herein are merely exemplary implementations.

The subject matter may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an implementation of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks.

The program or code segments can be stored in a processor-readable medium or transmitted by a computer data signal embodied in a carrier wave over a transmission medium or communication path. The “computer-readable medium”, “processor-readable medium”, or “machine-readable medium” may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

Some of the functional units described in this specification have been referred to as “modules” or “units” in order to particularly emphasize their implementation independence. For example, functionality referred to herein as a module or unit may be implemented wholly, or partially, as a hardware circuit comprising custom VLSI circuits or gate arrays, off-the-shelf semiconductors such as logic chips, transistors, or other discrete components as described above. A module may also be implemented in programmable hardware devices such as field programmable gate arrays, programmable array logic, programmable logic devices, or the like. Modules or units may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

In this document, relational terms such as first and second, and the like may be used solely to distinguish one entity or action from another entity or action without necessarily requiring or implying any actual such relationship or order between such entities or actions. Numerical ordinals such as “first,” “second,” “third,” etc. simply denote different singles of a plurality and do not imply any order or sequence unless specifically defined by the claim language. The sequence of the text in any of the claims does not imply that process operations must be performed in a temporal or logical order according to such sequence unless it is specifically defined by the language of the claim. The process operations may be interchanged in any order without departing from the scope of the invention as long as such an interchange does not contradict the claim language and is not logically nonsensical.

Furthermore, the foregoing description may refer to elements or nodes or features being “coupled” together. As used herein, unless expressly stated otherwise, “coupled” means that one element/node/feature is directly or indirectly joined to (or directly or indirectly communicates with) another element/node/feature, and not necessarily mechanically. For example, two elements may be coupled to each other physically, electronically, logically, or in any other manner, through one or more additional elements. Thus, although the drawings may depict one exemplary arrangement of elements directly connected to one another, additional intervening elements, devices, features, or components may be present in an implementation of the depicted subject matter. In addition, certain terminology may also be used herein for the purpose of reference only, and thus are not intended to be limiting.

While at least one exemplary implementation has been presented in the foregoing detailed description of the invention, it should be appreciated that a vast number of variations exist. It should also be appreciated that the exemplary implementation or exemplary implementations are only examples, and are not intended to limit the scope, applicability, or configuration of the invention in any way. Rather, the foregoing detailed description will provide those skilled in the art with a convenient road map for implementing an exemplary implementation of the invention. It being understood that various changes may be made in the function and arrangement of elements described in an exemplary implementation without departing from the scope of the invention as set forth in the appended claims.

What is claimed is:

1. A method, comprising:

receiving, by at least one processor remote from an aircraft, fault data automatically transmitted from the aircraft without initiation by a user on the aircraft and indicating a type of fault indicating a component on the aircraft that caused the fault, and wherein the type of fault is determined by analyzing parameter data generated by one or more sensors monitoring at least one parameter of the component;

analyzing, by at least one processor remote from the aircraft, the fault data to confirm whether the fault data correctly indicates the type of fault exists;

transmitting instructions to the aircraft to perform or not perform an act related to the fault;

receiving parameter data that has one or more parameter values beyond a designated range of acceptable values but that does not trigger a conclusion of a type of fault exists and is not limited to being related to the received indication of a type of fault;

automatically analyzing the parameter data to predict a future fault of a component on the aircraft; and warning a user on the aircraft of the future fault.

2. The method of claim 1, comprising transmitting a request for more fault-related data to the aircraft while the aircraft is on the same flight when the fault data was transmitted; automatically receiving the fault-related data from the aircraft in response to the request and without a user on the aircraft initiating a transmission of the fault-related data; and using the fault related-data to confirm a fault of the type of fault exists or determine the fault is a false positive.

3. The method of claim 2, comprising automatically transmitting the request upon automatically determining data is missing that is to be used to confirm the fault exists and the type of fault.

4. The method of claim 2, comprising transmitting the request upon manual activation by a user remote from the aircraft.

5. The method of claim 1, comprising receiving basis parameter data from the aircraft that was used to determine the type of fault at the aircraft; and comparing the basis parameter data to at least one of: historical incident data and maintenance records to predict a future fault of a component on the aircraft.

6. The method of claim 1, wherein the instructions are transmitted to attempt to be in time for a user on the aircraft to implement or avoid an action related to the fault.

7. The method of claim 1, wherein the fault data received from the aircraft comprises data of a fault tree with a predetermined fault tree structure expected for the analyzing and that indicates the type of fault.

8. The method of claim 7, wherein the fault tree is in a form of a binary fault tree code, wherein individual bits in the code correspond to a different node in the fault tree, and the method comprises decoding the fault tree code before analyzing the fault tree.

9. The method of claim 1, wherein the fault data comprises a fault tree code representing a predetermined fault tree structure and indicating the type of fault; the method comprising:

decoding, by the at least one processor, the fault tree code using a stored fault tree template;

receiving basis parameter data used onboard the aircraft to determine the type of fault;

determining whether additional basis parameter data is missing for confirming the type of fault;

when additional basis parameter data is missing, automatically transmitting a request to the aircraft during the same flight and automatically receiving the requested additional basis parameter data without initiation by a user on the aircraft; and comparing the basis parameter data to at least one of: performance data, historical incident data, and maintenance records to confirm that the type of fault exists or determine that the type of fault is a false positive, wherein the transmitting comprises transmitting during the same flight, and the instructions provide ignoring the fault when the fault is determined to be a false positive.

10. An aircraft, comprising:

sensors monitoring components on the aircraft;

processor circuitry forming at least one processor arranged to operate by:

generating sensor parameter data by using the sensors;

analyzing the sensor parameter data to determine if one of the components has a fault;

generating fault data in the form of a fault tree indicating the type of fault;

automatically transmitting the fault data without a user on the aircraft initiating the transmission; and receiving a fault confirmation transmission that provides an alert that confirms the fault exists and the type of fault or indicates the fault is a false positive, wherein the analyzing comprises determining whether a difference between expected parameter data and sensed parameter data is greater than a threshold.

11. The aircraft of claim 10, wherein the expected parameter data is generated by using aircraft performance data.

12. The aircraft of claim 10, wherein the expected parameter data is generated by using aircraft data indicating cockpit control settings, commands, or both.

13. The aircraft of claim 10, wherein the expected parameter data is generated by factoring climate-related data to determine whether a fault was caused by a climate event.

14. A system, comprising:

an aircraft, comprising:

sensors monitoring components on the aircraft;

memory; and first processor circuitry forming at least one first processor communicatively coupled to the sensors and the memory, and being arranged to operate by:

generating sensor parameter data by using the sensors, analyzing the sensor parameter data to determine if one of the components has a fault, generating fault data in the form of a fault tree indicating the type of fault, and automatically transmitting the fault data including a fault tree code and without a user on the aircraft initiating the transmission; and a remote system remote from the aircraft, comprising:

memory; and second processor circuitry forming at least one second processor communicatively coupled to the memory, and being arranged to operate by:

receiving the fault data and decoding the fault tree code, analyzing the fault data to confirm whether the fault data correctly indicates the type of fault exists, and transmitting instructions to the aircraft to perform or not perform an act related to the fault, wherein the transmission of fault data from the aircraft only occurs when a fault is detected.

15. The system of claim 14 wherein the analyzing of the sensor parameter data comprises comparing expected parameter data to sensed parameter data, and wherein the expected parameter data is generated by factoring climate-related data to determine whether a fault was caused by a climate event, and comprising obtaining parameter values based on sensor signals captured before a climate event and sensor signals captured during the climate event.

16. The system of claim 14, wherein the analyzing of the sensor parameter data comprises determining whether a difference between expected parameter data and sensed parameter data is greater than a fault threshold that indicates a fault exists and a small deviation threshold that is less than the fault threshold and indicates a small deviation in a parameter value that indicates a potential of a future fault of the component, and wherein the second processor is arranged to receive parameter data of parameters greater than the second threshold but less than the first threshold to be used to predict a future fault.

17. The system of claim 14, wherein the analyzing of the fault data comprises inputting at least one of: the fault data, basis parameter data that was used to determine the fault data at the aircraft, performance data, historical incident data, and maintenance records into a neural network.

* * * * *